United States Patent [19]

Büdenbender

[11] Patent Number: 4,854,467

[45] Date of Patent: Aug. 8, 1989

[54] CONTAINER OF SHEET METAL

[76] Inventor: Bernd Büdenbender, Schubertweg 5, 2160 Stade, Fed. Rep. of Germany

[21] Appl. No.: 161,160

[22] Filed: Feb. 26, 1988

[30] Foreign Application Priority Data

Mar. 4, 1987 [DE] Fed. Rep. of Germany ....... 3706916
Jan. 24, 1988 [DE] Fed. Rep. of Germany ....... 3802000

[51] Int. Cl.$^4$ .............................................. B65D 8/20
[52] U.S. Cl. ...................................................... 220/67
[58] Field of Search ....................... 220/67, 75, 76, 77, 220/78, 79

[56] References Cited

U.S. PATENT DOCUMENTS 2,576,767  11/1951  A'ttearn ................................ 220/67
3,295,485  1/1967  Gedde ................................ 220/67 X

FOREIGN PATENT DOCUMENTS 220391  8/1924  United Kingdom ................. 220/67

Primary Examiner—Donald F. Norton
Attorney, Agent, or Firm—Toren, McGeady & Associates

[57] ABSTRACT

A container of sheet metal includes a side wall whose ends are connected by means of a fold to a bottom wall and/or a top wall. Each fold is additionally reinforced, secured and/or sealed by welding. The welding seam is arranged along an outer, exposed toroidal surface of the fold and extends within an end portion of a circular arc formed in cross-sectional direction of the fold. The end portion is located near the rim regions of the walls being connected.

10 Claims, 2 Drawing Sheets

CONTAINER OF SHEET METAL

BACKGROUND OF THE INVENTION

1. Field of the Invention

The present invention relates to a container of sheet metal including a wall whose ends are connected by means of a fold to a bottom wall and/or a top wall. Each fold is additionally reinforced, secured and/or sealed by soldering and/or by welding.

2. Description of the Prior Art

It is basically known in the art to connect bottom walls and/or top walls of containers to the side walls thereof by means of folds or by means of welding. When folds are used, it may be necessary to seal the folds by applying a sealing agent on the portions of the walls to be folded. In the manufacture of containers of tin sheet, it is also known to seal the folds by means of soldering.

Moreover, it is known from German Offenlegungsschrift No. 35 46 458, in the manufacture of containers of the above-described type, to connect at least two of the layers of the fold after the fold has been finished by means of fusion welding at least at some locations in order to improve the strength of the fold and, in the case of continuous welding, the tightness of the fold.

However, it has been found that, in the case of fusion welding seams made by laser beams in folds, frequently the desired reinforcement of the mechanical connection and the desired absolute tightness of the container are not ensured.

As described in German Offenlegungsschrift No. 35 46 458, at least two, preferably three, layers of the sheet metal are welded together. However, in many regions of a fold, the layers of sheet metal forming the fold are not located directly one on top of the other, but rather they are separated from each other by an air gap, so that a laser beam can melt the individual layers, but these layers cannot be connected with each other. In this connection, it cannot even be assumed that such gap-like hollow spaces within a fold are present only at certain locations because, even when the containers are carefully manufactured and the folds are prepared by exact folding devices, it may occur that the folds are incorrectly formed resulting in conditions which deviate from those present in properly formed folds and in additional hollow spaces which make fusion welding impossible.

It is, therefore, the primary object of the present invention to provide welding seams effected by fusion weldings for the mechanical strengthening and/or sealing of folds in such a way that the manufacture of a strengthening and sealing welding connection is ensured even if the folds are formed in a manner deviating from the conventional.

SUMMARY OF THE INVENTION

In accordance with the present invention, the welding seam is arranged along an outer, exposed toroidal or fold surface of the fold and extends within an end portion of a circular arc formed in cross-sectional direction of the fold, the end portion being located near the rim region of the metal sheets being connected.

The present invention utilizes the fact that, when such a fold is being prepared, the outer metal sheet is pressed firmly at least in the end portions of the outer toroidal or fold portion against the metal sheet located therebelow and, even after the fold has been prepared, the outer metal sheet still rests on the lower metal sheet with initial tension and, thus, in a positive manner and with the exclusion of any air gaps or hollow spaces. As a result, a laser beam directed to this portion of the fold will safely reach two layers which rest directly on top of each other and will safely connect these two layers. In addition, not only a strengthening of the fold and a safe sealing of the fold is achieved, even incorrectly formed folds can meet the desired requirements with respect to tightness and strength, so that the number of rejects in the manufacture of containers can be significantly reduced.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
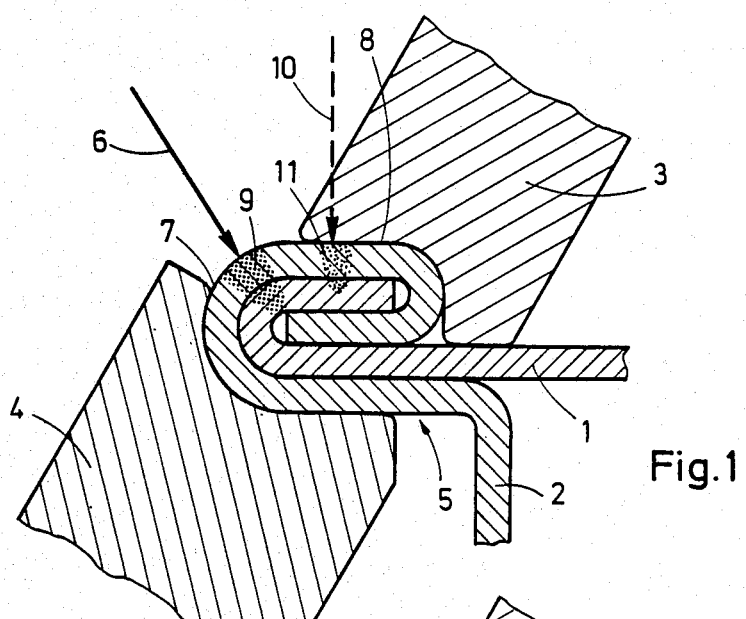
FIG. 1 is a schematic sectional view of a fold connecting a side wall and a bottom wall of a container, the fold being held in a defined position, with a conventional welding seam and a welding seam according to the present invention.

As illustrated in FIG. 1 of the drawing, a container of sheet metal includes a side wall 1 and a bottom wall 2. The rim portions of the walls 1 and 2 are connected together by means of a fold 5. The fold 5 is held and guided by means of pressure rollers 3 and 4.

Another connection of the walls 1 and 2 is to be effected by means of a welding seam obtained by means of fusion welding with the aid of a laser beam 6. Laser beam 6 is directed to the outer, exposed toroidal or fold surface 7 of the fold 5 located opposite the side wall in such a way that the laser beam impinges upon the toroidal surface in the end portion thereof adjacent the plane cover or overlap portion 8. As a result, a welding seam 9 effected by fusion welding and indicated in the drawing by stippling is formed in the end portions of a circular arc formed in the toroidal portion of the fold. In this regard, it can be assumed that in this position the outer of the metal sheets always rests on the lower of the metal sheets under initial tension and, thus, when the laser beam is adjusted appropriately and the metal sheets are heated appropriately, the layers located directly one above the other are subjected to a penetrating fusion welding.

The pressure rollers 3 and 4 prove advantageous during welding. The fold 5 is held between the rollers 3 and 4 and, thus, the fold 5 is positively positioned at least in the region of the rollers. One of the rollers, for example, pressure roller 3, advantageously is mounted on an axially stationary shaft which is driven in such a way that the circumferential speed of the roller corresponds to the desired welding speed. The opposite pressure roller is mounted on a slidable or pivotable axis and is pretensioned against pressure roller 3 by means of spring elements, pneumatic elements and/or hydraulic elements, not shown, so that the fold 5 is grasped by the rollers under initial tension. If required, the shaft of the second pressure roller may also be a driven shaft.

The pressure rollers 3 and 4 grasping the fold 5 make possible a clear positioning of the fold 5 at least in the regions engaged by the pressure rollers 3 and 4. At the same time, the pressure rollers leave the outer angular portion of the fold surface 7 exposed, so that the laser beam 6 can be applied without impairment. It is an advantage that this exact positioning makes possible an exact focusing of the laser beam and a use of the laser beam in the optimum range thereof, while the position of the desired welding seam in the outer arc portion of the fold surface 7 is sufficiently defined.

By providing at least one of the pressure rollers 3 and 4 with a rotary drive which is preferably adjustable or controllable, the desired feeding speed and, thus, the optimum welding speed can be adjusted.

It has been found to be an additional advantage that the initial tension of the pressure rollers permits not only a feeding of the fold 5 with little slippage, but also provides a pretensioning of the sheet metal portions forming the fold which causes additional pressure forces to act on the fold in the angular portions of the fold surface 7 recommended for the welding seam. As a result, the pressure between the layers of sheet metal to be welded together is further intensified and the success of the welding is ensured.

A conventional welding seam is illustrated in the drawings for comparison purposes. A laser beam 10 is directed onto an essentially plane cover surface 8. First, it is to be noted that welding is carried out within the range of application of the pressure rollers 3 and 4 and, therefore, the mounting and arranging of the welding device may lead to certain complications. The welding device must be arranged offset the pressure rollers used for positioning purposes, so that the welding device is not located in the exactly positioned range of the fold. This offset arrangement means that problems may occur with respect to focusing of the laser beam. The important aspect is that welding must be carried out without increased initial tension and the cover portion 8 rests on the layer of sheet metal therebelow only with insufficient initial tension and, thus, the possibility exists that the cover portion 8 is spaced apart, although by a small distance, from the layer below. In this situation, essentially the layer which includes the cover portion 8 is heated, however, heating of the lower layer and the flowing together of melted quantities of metal for forming a welding seam are not ensured. Rather, it is possible that the melted metal of the upper layer will flow downwardly without being connected with the lower layer.

Figure 2:
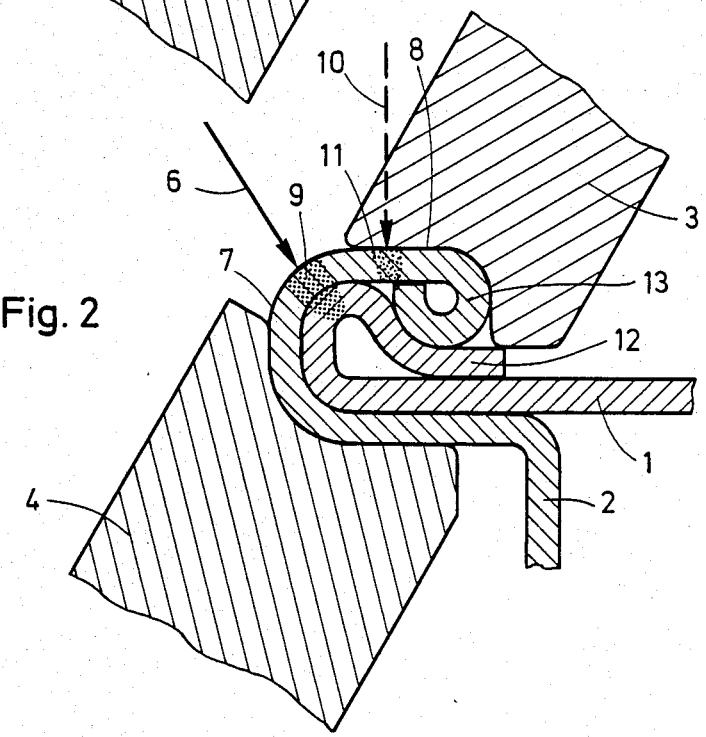
FIG. 2 is a schematic sectional view of an incorrectly formed fold, illustrating the same welding seams as in FIG. 1.

Similar difficulties arise when the fold is incorrectly formed. FIG. 2 illustrates such an incorrectly formed fold in which the rim portion 12 of the side wall 1 is pressed directly against the side wall 1 without engaging the outer rim portion of the bottom wall 2. Rather, the rim portion 13 of the bottom wall 2 is rolled into a round fold.

In the case of the fold illustrated in FIG. 2, in the area of the outer fold surface 7, a secure contact with initial tension exists between the outer round portion and the bent portions of the side wall 1 underneath the outer portion. This contact is further intensified by the pressure of the pressure rollers 3 and 4. As a result, a laser beam 6 acting in this area creates a problem-free mechanical reinforcing, and simultaneously sealing, welding seam 9.

If, on the other hand, a laser beam 10 directed against the plane cover portion 8 were used, the material of the bottom wall 2 would melt in the region 11. However, a free space exists between the fold formed at the end of the side wall and the rim portion 13 of the bottom wall 2. In this case, the cover portion would be melted under the influence of the laser beam 10. However, no possibility exists for a connection with a metal layer located below, so that only a melting and solidification occurs in the welding seam 11. It may even be possible that the melted material will flow downwardly into the hollow space formed in the fold and, thus, slot-like holes are burned in the outer cover portion.

Accordingly, for securely obtaining the desired strong and tight connection, the laser beam 6 is to be directed to the end portion of the circular arc formed in cross-sectional direction in the fold portion 7. The laser beam 6 itself is directed toward the perpendicular relative to the middle of the circular arc. Laser beam 6 and, thus, the resulting welding seam 9 include with this perpendicular an angle which is between 10° and 90°. It is better if this angle is between 15° and 80°. Preferably, the angle is 40° to 70°. A clear positioning of the fold 5 in the region to be welded is achieved by pressure rollers 3 and 4 which simultaneously secure the optimum welding speed and an additional contact pressure.

However, it has been found that, particularly if the fold surface 7 is substantially curved, it is difficult to focus a laser beam 6 used for welding because an even slight lateral deviation of the laser beam 6 means that the distance between the laser beam source and its point of impingement on the fold surface changes.

Figure 3:
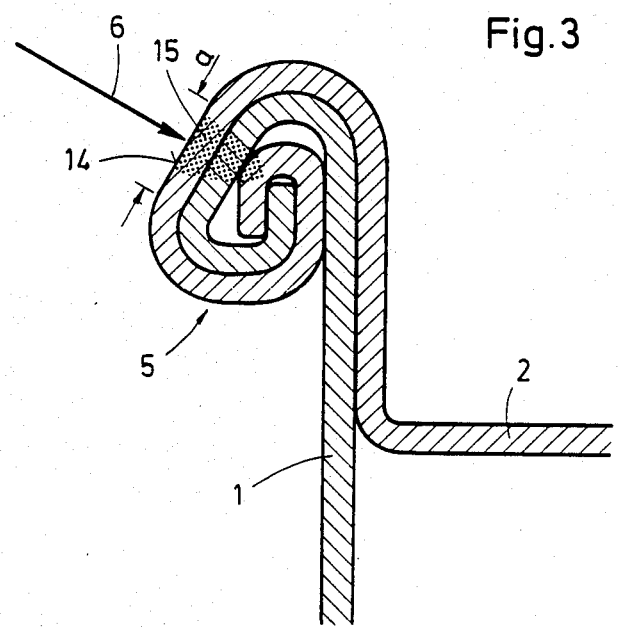
FIG. 3 is a schematic sectional view of a fold including a conical outer portion, including a welding seam formed in this portion.

Such deviations in distance can be prevented if the area of impingement of the laser beam is plane or even slightly concave. An example of a fold secured against slight lateral deviation of the laser beam is illustrated in FIG. 3. In the fold 5 illustrated in FIG. 3, the side wall 1 has a conical portion 14 which includes an acute angle with side wall 1. This conical portion 14 extends perpendicularly relative to the laser beam 6, so that the laser beam for making the welding seam 15 is directed approximately toward the middle of the conical portion.

When the fold has the shape illustrated in FIG. 3, a slight lateral relative movement between the laser beam 6 and the conical portion 14 of the fold 5 does not change the distance between the source of the laser beam and its point of impingement and, therefore, can have no negative influence on the focusing of the laser beam.

In order to eliminate the problems caused by slight lateral movements, while simultaneously ensuring a safe, secure, mechanical contact at least of the two outer layers of sheet metal, it has been found advantageous to select the width a of the conical portion not less than 1.4 and not more than 5 times the thickness of the sheet metal.

In each of these cases it is ensured that the laser beam is directed onto a portion which is subjected to initial tension and rests tightly and without any intermediate space on the lower sheet metal layer, so that the formation of a continuous, perfect fusion welding seam 9 is ensured.

While specific embodiments of the invention have been shown and described in detail to illustrate the application of the inventive principles, it will be understood that the invention may be embodied otherwise without departing from such principles.

I claim:

1. A container of sheet metal including a side wall and an end wall extending transversely the side wall, the side wall and the end wall having rim portions and an edge extending along each said rim portion, the rim portions being connected by means of a fold, the fold including an outer, exposed fold surface on said rim portion of one of said side wall and end wall and formed by an outer layer of said fold with an inner layer within said fold formed by the other one of said side wall and end wall and in surface contact with said outer layer, the edges of said side wall and end wall located within said fold, a pair of spaced apart circular arcs formed in said fold by said outer and inner layers and spaced from said edges, and comprising a first circular arc and a second circular arc spaced apart along the outer, exposed fold surface with said first circular arc located closer to the edge of said outer layer, said fold being additionally reinforced, and said outer and inner layers being secured and sealed by a welding seam, the welding seam being arranged along the outer, exposed fold surface and extending within the fold from the outer layer to the inner layer where said outer and inner layers are in surface contact, and said welding seam being spaced from said edge of said side and end walls.

2. The container according to claim 1, wherein the welding seam includes with a perpendicular relative to the middle of the second circular arc of the fold surface an angle of from between 10° to 90°.

3. The container according to claim 2, wherein the angle is 15° to 80°.

4. The container according to claim 2, wherein the welding seam is a fusion welding seam obtained by a laser beam.

5. The container according to claim 1, wherein the outer, exposed fold surface includes a conical portion located between said first and second circular arcs, and the welding seam being located within the conical portion.

6. The container according to claim 5, wherein the conical portion has a length between the first and second circular arcs of 1.4 to 5 times the thickness of one of the end wall and the side wall.

7. The container according to claim 5, wherein the laser beam is directed essentially toward the middle of the conical portion between said first and second circular arcs.

8. The container according to claim 5, wherein the conical portion is slightly concave.

9. The container according to claim 5, wherein said inner layer between said first and second circular arcs defines a conical portion located in surface contact with the conical portion formed by the outer, exposed fold surface.

10. The container according to claim 1, wherein said welding seam is located in an end portion of said second circular arc closer to said first circular arc.

* * * * *